United States Patent [19]

Benchetrit et al.

[11] Patent Number: 5,247,173
[45] Date of Patent: Sep. 21, 1993

[54] DEVICE FOR THE ACQUISITION OF THE INSTANTANEOUS ANGULAR POSITION OF MOVING MEANS AND OPTO-MECHANICAL SYSTEMS INCORPORATING SUCH A DEVICE

[75] Inventors: Thierry Benchetrit, Creteil; Joël Rollin, Vanves; Jean-Claude Bourgeois, Magny les Hameaux, all of France

[73] Assignee: Thomson TRT Defense, Guyancourt, France

[21] Appl. No.: 886,819

[22] Filed: May 22, 1992

[30] Foreign Application Priority Data

May 24, 1991 [FR] France ............................ 91 06274

[51] Int. Cl.⁵ .................................................. G01D 5/30
[52] U.S. Cl. ........................................ 250/230; 250/236; 250/561
[58] Field of Search ............... 250/230, 236, 237, 235, 250/561; 356/371, 373, 375, 124, 125; 359/529, 555, 351

[56] References Cited

U.S. PATENT DOCUMENTS

| | | | |
|---|---|---|---|
| 3,802,779 | 4/1974 | Fletcher et al. | 250/236 |
| 4,127,781 | 11/1978 | Sato . | |
| 4,152,588 | 5/1979 | Klatt et al. | 250/230 |
| 4,616,132 | 10/1986 | Kessler | 250/236 |
| 4,647,145 | 3/1987 | Maeda et al. | 250/236 |

FOREIGN PATENT DOCUMENTS

0143687  6/1985  European Pat. Off. .
2079561  1/1982  United Kingdom .

OTHER PUBLICATIONS

Optical Engineering, vol. 26, No. 12, Dec. 1987, pp. 1245-1250; M. Rioux, et al.: "Design of a Large Depth of View Three-Dimensional Camera for Robot Vision".

*Primary Examiner*—David C. Nelms
*Assistant Examiner*—Que T. Le
*Attorney, Agent, or Firm*—Oblon, Spivak, McClelland, Maier & Neustadt

[57] ABSTRACT

The present invention concerns device for the acquisition of the angular position of mobile means of the type including a luminous source emitting an incident beam in a known direction and a reflecting surface attached to the mobile means. The device also includes an array of elementary charge coupled sensors positioned so as to be at least partly scanned by the reflected beam. The device includes in addition optical means for limiting the width of the incident beam. The said array is connected to an electronic circuit producing a digital signal varying according to the position and/or the number of elementary sensors illuminated by the reflected beam.

6 Claims, 1 Drawing Sheet

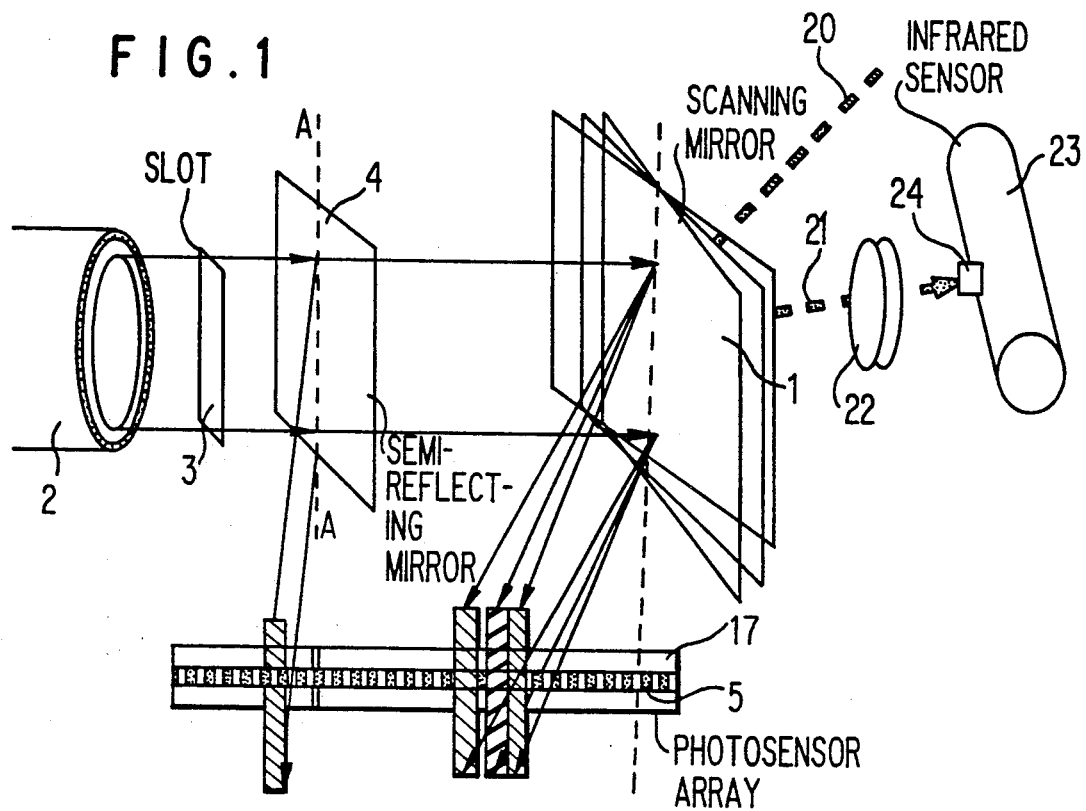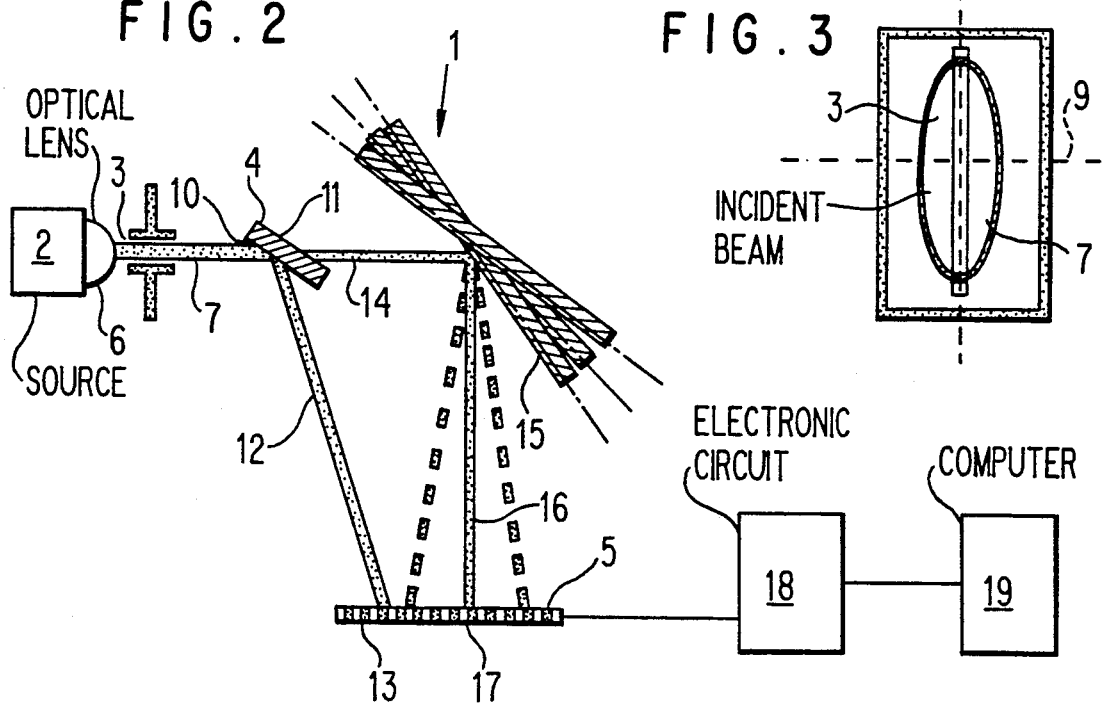

DEVICE FOR THE ACQUISITION OF THE INSTANTANEOUS ANGULAR POSITION OF MOVING MEANS AND OPTO-MECHANICAL SYSTEMS INCORPORATING SUCH A DEVICE

BACKGROUND OF THE INVENTION

1. Field of the Invention

The present invention concerns a device for the acquisition of the angular position of moving mechanical means, and also opto-mechanical systems incorporating such devices.

The present invention is particularly designed for the production of thermal scanning cameras. It is not, however, limited to such an application, and is suitable for use in many opto-mechanical systems such as scanners, imagery systems, laser projection systems or servomechanisms.

2. Description of the Related Art

Particularly known in the prior art are the thermal cameras designed by the applicant, implementing devices for position sensing and automatic control of the scanning mirror. These devices make it possible to accurately control the orientation of a field mirror executing a saw tooth movement. The position sensing accuracy particularly affects the quality of the image and the performance of the equipment, as a modification of the scanning amplitude or a defect in the linearity of the rotational movement can cause an anamorphosis or lead to unacceptable deformations of the image.

The position sensor must also detect any drift of the optical axis of the scanning mirror, in particular when the thermal camera is used in position finding and target sighting for the firing and guidance of missiles.

In the prior art, the system of acquisition of the instantaneous position of a scanning mirror makes use of one angular copy sensor and a second reference copy sensor.

The first sensor includes a luminous source comprising a light emitting diode, collimation optics, a diaphragm of special shape capable of linearizing the response of the sensor, a mirror fixed to the back of the scanning mirror and a photosensitive sensor with two complementary quadrants. The beam, collimated to infinity, hits the two quadrants after being reflected by the mirror attached to the back of the scanning mirror.

The light flux received by each of the two complementary quadrants varies according to the angular position of the scanning mirror. In fact, when the mirror is in a median position, each of the quadrants receives an identical flux. When the mirror is offset from its median position, one quadrant receives the flux on part of its surface only, whereas the other quadrant receives a flux on the whole of its surface. The output voltage of the first quadrant is consequently lower than that of the complementary quadrant, and an appropriate analog circuit delivers a signal corresponding to the difference between the output voltages.

Signal drift caused by variations of the emission power are corrected by regulating the source power depending on the sum of the voltages delivered by the two cells. The geometrical shape of the quadrants is particularly important, because any variation would lead to imperfect linearity of the photosensitive sensor response. Moreover, it is clear that the size of each of the quadrants must be approximately half that of the course scanned by the reflected beam, which means that photoresistant cells must be used in the manufacture of each of the quadrants. Given the relatively large size of this photosensitive sensor, it is difficult to prevent drift owing to the different response curves of the two quadrants and the thermal fluctuations experienced by these quadrants.

Moreover, in order to facilitate operation of the device over the whole course of the mobile mirror, the beam must have substantially the same width as the sensor. Since known sensors operate according to a principle of differential measurement of the flux, it is essential that, regardless of the position of the reflected beam, each quadrant receives part of this beam. The luminous source must consequently have sufficient intensity to make the flux of the reflected beam compatible with a correct response of the two photoresistant quadrants, even when only a small part of the quadrant is illuminated, which occurs when the moving means is in an end position. For this reason, the energy consumption of the previously known system is considerable.

Furthermore, in order to compensate for drift of the first sensor, it is necessary to have a second sensor, the purpose of which is to memorize the instantaneous value of the signal output by the first sensor, when the mirror is in a reference position. This voltage is then fed back into the control loop in order to compensate any possible drift.

Previously known devices present various disadvantages. In particular, the known sensing system requires very precise mechanical adjustment of the different components, and is for this reason relatively sensitive to thermal variations. Furthermore, it requires specific expensive components, such as selected and mated photosensitive sensors, or specific electroluminescent diodes. In addition, in order to improve the precision of the second sensor, multiple reflections are used to create an optical lever arm. This solution involves adjusting and setting difficulties.

Other solutions implement inductive or potentiometric sensors. These solutions, however, are not always completely satisfactory, notably because they complicate the scanning mirror driving systems and moreover because they do not provide sufficient precision.

SUMMARY OF THE INVENTION

The purpose of the present invention is to overcome these different disadvantages by proposing a device for the acquisition in real time of the angular position of a moving mechanical means around a rotational axis, of the type including a luminous source emitting an incident beam in a known direction, a reflecting surface attached to the moving means, means of detecting the beam reflected by the said reflecting surface and means for delivering a reference signal. The means for detecting the reflected beam comprise a CCD (Charged Coupled Device) line array provided so as to be at least partly scanned by the reflected beam during the movements of the moving means. The CCD line array is formed by a line of several adjoining elementary charge coupled sensors with dimensions substantially smaller than the length of the zone covered by the beam reflected by the reflecting surface. The device also includes optical means to limit the width of the incident beam. The width of the elementary sensors comprising the array being at least ten times less than the path scanned by the reflected beam. The array is linked to an electronic circuit delivering a digital signal varying according to the position and/or the number of elementary sensors illuminated by the reflected beam.

This embodiment is particularly advantageous in that the signal delivered by the device is digital, making it easily possible to linearize the control signal and to correct different types of drift. Moreover, the mechanical construction of the device according to the invention does not require complex adjustments and settings, and allows a significant manufacturing tolerance, which will be able to be compensated by the computer processing of the signals delivered by the CCD line array of adjoining charge coupled sensors.

The use of only one photosensitive element also contributes to mechanical simplification, whereas in previously known systems the drift of the first sensor had to be compensated by means of a reference signal delivered by a second sensor whose positioning and adjustment were particularly delicate because of the size of the optical lever arm used.

Moreover, the device according to the invention allows the use of a luminous beam producing a spot which is almost a point, because it does not implement a process for the differential measurement of the flux. For this reason, it makes it possible to significantly reduce the power of the luminous source and therefore the electricity consumption.

The means for delivering a reference signal can comprise a computer which outputs a signal which is a function of the integral of the position signal over a period of several cycles of movement of the moving means. This embodiment facilitates the mechanical simplification of the device. Moreover, the use of a single component — the CCD line array — to detect the reflected beam with a view to on the one hand acquiring the angular position of the moving means and on the other hand delivering the reference signal, avoids all hazard of adjustment failure or drift of the reference signal relative to the position signal.

According to a preferred embodiment, the means for delivering a reference signal comprise a fixed semireflecting mirror or plate provided between the luminous source and the reflecting surface attached to the moving means, the said semi-reflecting mirror reflecting part of the incident beam onto an array of elementary charge coupled sensors. A first series of sensors of the array is reserved for the generation of a reference signal and a second series of sensors for generating the, signal representing the angular position of the mirror.

According to an alternative embodiment, the semireflecting mirror reflects the incident beam onto the useful portion of the array, the position signal being distinguished from the reference signal by means of a digital processing of the signal generated by the said array.

According to an advantageous embodiment, the optical means for limiting the width of the incident beam include a slot provided between the luminous source and the fixed semi-reflecting plate. The luminous source thus produces a beam whose section is substantially elliptic. Preferably, the width of the beam is adjusted so as to produce a spot as narrow as possible on the array. The light flux is thus used to the best advantage and consequently the power of the luminous source can be reduced, without affecting the quality of the signal output by the CCD array. This power reduction is an important advantage for on-board applications, for example for the control of the scanning mirror of thermal cameras mounted in aircraft or satellites.

Given the elongated shape of the spot, an alignment defect of the luminous source does not have major consequences regarding the validity or definition of the signal.

In order to optimize the width of the luminous spot projected by the reflected beam onto the sensor array, the width of the slot is approximately equal to:

$$a = \sqrt{2\lambda D}$$

where D is the optical distance between the slot and the sensor array; $\lambda$ is the wavelength of the luminous source.

"Approximately equal to" means that the width of the slot corresponds to the abovementioned value plus or minus the usual machining and/or manufacturing tolerances. Under these conditions, the effects of diffraction by the edges of the slot are minimized.

Preferably, the reflecting surface reflecting the incident beam in the direction of CCD array constitutes part of the unused section of the surface of the moving means. Thus, the disadvantages related to the preparation of a supplementary scanning mirror and attaching it to the moving part are eliminated. Moreover, this embodiment facilitates the reduction of the inertia of the mobile system.

The present invention also concerns the application of the device for controlling the oscillating scanning mirror of an opto-mechanical system, in particular thermal cameras, scanners or laser projection systems.

BRIEF DESCRIPTION OF THE DRAWINGS

The present invention will be better understood from the reading of the following description concerning a preferred embodiment made with reference to the appended drawings, of which:

FIG. 1 represents a diagram of the device according to the invention;

FIG. 2 represents a transversal section of the device according to the invention;

FIG. 3 represents a enlarged section along AA' of the incident beam.

DESCRIPTION OF THE PREFERRED EMBODIMENT

The device according to the invention, an example of the embodiment of which is illustrated by FIGS. 1 and 2, includes a scanning mirror (1) which comprises the moving means whose angular position we wish to know in real time, and whose movements must be controlled. This scanning mirror is driven by a vibratory movement of a frequency of about 50 Hz and an amplitude of +/−10° about a central position.

A thermal camera usually includes an infra-red sensor (23) cooled by a low temperature fluid contained in a reservoir (24). The field observed is scanned by a line mirror and a frame mirror connected to electronic synchronization circuits. The incident beam (20) corresponding to an analyzed point is reflected by the scanning mirror (1). The beam (21) reflected by the said scanning mirror is then concentrated by suitable optics (22) onto the infra-red sensor (23). Each of the frame and line scanning mirrors include sensing means making it possible to find out its precise angular position at any moment, in order to reconstitute an image with no deformation.

The copying means comprise a luminous source (2), a calibrated slot (3), a semi-reflecting mirror (4) and an array of photosensitive sensors (5).

The luminous source comprises a laser diode emitting a visible beam of wavelength 675 nm, and controllable output power of approximately 1 mW. It includes an optical lens (6) and generates a luminous beam whose divergence is less than 0.9 mrad along the principal propagating axis and 0.3 mrad along the secondary axis perpendicular to the principal axis. The principal axis is perpendicular to the plane formed by the propagating axis of the incident beam (7) and the propagating axis of the reflected beam (16), so that the spot formed by the reflected beam (16) on the CCD array (5) is elongated in a direction approximately perpendicular to the principal axis of the said array.

FIG. 3 represents a section of the incident beam (7) at the slot (3). Before passing through the slot (3), the section of the beam is substantially elliptic, the dimension measured along axis OY (8) being about 4.5 mm and along the short axis OX (9) about 1 mm. The illumination at the slot forms an elliptical gaussian type curve.

After being shaped by the slot (3), the incident beam is split into two by a semi-reflecting mirror (4) including a non dazzling front surface (10) and a rear surface (11) whose transmission factor is approximately 0.5. This embodiment makes it possible to prevent double reflections which would interfere with the operation of the acquisition device.

Part of the beam (12) is reflected by the semireflecting mirror (4) in the direction of a first zone (13) of the CCD array (5) referred to as the reference zone. The position of the impact of this reflected beam (12) on the first zone (13) is representative of the direction of the incident beam (7), and the corresponding signal therefore facilitates the correction of alignment defects, variations in the mechanical positioning or thermal variations of the axis of the luminous source (2).

The second part (14) of the beam, not deflected by the semi-reflecting mirror (4), is reflected by the back (15) of the scanning mirror (1). The mirror (1) is represented in FIG. 1 and FIG. 2 in a median position as well as in the two end positions, the dotted lines representing the direction of the reflected beam (7) when the scanning mirror (1) is in an end position. In a particular embodiment, the back of the scanning mirror (1) is machined and presents parallel marks in the plane containing the incident beam and the reflected beam, to constitute a possibly usable diffraction network. The incident beam (14) is reflected by the reflecting surface (15) of the scanning mirror (1) in the direction of the array of photosensitive sensors (5).

This array presents, in the example described, 1024 pixels or elementary sensors of a dimension of 13 m × 13 m, and an optical pass-band included between 400 nm and 1100 nm. For example, the array can consist of the component commercialized by the company THOMSON under the reference TH7804 (Z). The reflected beam (16) forms a luminous spot on the array (5), located on the useful zone (17), the position of the said spot varying according to the angular position of the scanning mirror (1). In the example described, the pixels are distributed so that 224 are in the reference zone (13) and the rest, that is approximately 800, are in the useful zone (17).

The luminous spots formed on the one hand by the beam reflected by the semi-reflecting mirror (4) and on the other hand by the scanning mirror (1) have a width of several sensors. The center of each spot is determined by processing digitally the signals output by the CCD array (5), this digital process consisting of a barycentric-type calculation.

The array (5) is connected to an electronic circuit (18) delivering on the one hand the supply voltage(s) of the CCD array (5) in addition to the different signals required for its operation (sampling clock). The electronic circuit also includes a threshold comparator, or, in the case of parallel processing, several threshold comparators, delivering a binary signal corresponding to the response of each elementary sensor. For the elementary sensors illuminated by the reflected beam (16), the circuit will deliver a signal of a first value, and for the elementary sensors which are not illuminated by the reflected beam (16), it will deliver a signal of a second value. The electronic circuit (18) will deliver a digital output signal consisting of a binary word including a number of bits corresponding to the number of elementary sensors, plus possibly some control bits. This signal is processed by a computer unit (19) which determines the barycenter of each spot according to an algorithm, known by a man skilled in the art. The threshold comparator makes it possible to eliminate variations in the light flux supplied by the luminous source (2).

In cases where the device does not include the semi-reflecting mirror (4), the computer unit (19) can include an extra stage carrying out an integration in time of the position signals. The period of integration is determined so as to cover several cycles of movement of the moving means (1). In the case of cyclic movements, a reference signal is thus determined, facilitating the correction of certain mechanical or thermal drifts of the device.

In order to optimize the device and to reduce the luminous power required, the width of the spots must be minimized. The width of the spots depends directly on the width of the slot (3). The causes of the widening of the beam are basically the following:

its intrinsic divergence;
diffraction at the slot;
the geometric image of the collimation slot.

For a luminous source of the type in question, the intrinsic divergence is 0.9 mrad. The diameter of the laser spot is therefore equal to:

$$\phi div = \alpha. D$$

where $\alpha$ is the intrinsic divergence of the laser source; D is the distance between the laser source and the CCD array.

The diameter of the diffraction spot caused by the slot is determined by the formula:

$$\phi diff = 2\lambda D/a$$

where $\lambda$ is the wavelength of the laser beam; a is the width of the slot.

Furthermore, the diameter of the spot resulting from the geometry of the slot corresponds to the width of the slot, that is:

$$\phi image = a.$$

Finally, the diameter of the spot on the array will be less than or equal to the sum of the three parameters given above, that is:

$$L = \phi\text{diff.} + \phi\text{image} + \phi\text{div.}$$

that is:

$$2\lambda D/a + a + \alpha D - L = 0$$

Formally, the solution of this second degree equation is:

$$a_{1,2} = \frac{L - \alpha D +/- \sqrt{\Delta}}{2}$$

with $\Delta = (\alpha D - L)^2 - 8 \lambda D$

The purpose being to reduce as much as possible the diameter L of the spot formed on the array, the null discriminant will be chosen and therefore:

$$L = a +/- \sqrt{8\lambda D}$$

(of course, only the positive solution is significant).

The value D depends on the space requirement of the device. For example:

$\alpha = 0.9$ mrad (divergence of the laser diode);
D=26 mm (distance between the slot and the CCD array);
$\lambda = 675$ nm (wavelength of the laser diode).

Consequently, L=399 μm, from which the optimal slot width can be deduced: a=200 μm (approx.).

To sum up, in the example described above, the optimal width of the slot (3) is approximately 200 μm, and the size of the spot which it produces is approximately 400 μm, and covers therefore approximately 30 sensors.

Another parameter directly affecting the quality of the device is the power of the luminous source. It has to be sufficient to obtain an adequate response of the sensors of the CCD array, but without reaching the saturation values of the said arrays.

The emission power of the laser diodes can be regulated. It is determined by a calculation of the light flux arriving on the array according to the size of the slot, the characteristics of the semi-reflecting mirror and the reflecting surface as well as the characteristics of the laser diode and the CCD array.

The above description of the invention is a non-limiting example. It is understood that specialists in the field will be able to produce many alternatives while remaining within the scope of the invention.

In particular, the distribution of the sensors of the CCD array in two zones, a reference zone and a measurement zone, can be replaced by the use of two separate CCD arrays, one serving exclusively for the establishment of a reference signal, the other serving exclusively for the acquisition of the position of the spot formed by the reflected beam. This embodiment can be envisaged when restrictions regarding the space requirement and shape make the use of a large CCD array problematic.

Moreover, in the embodiment described, the acquisition device is optically isolated from the imagery system by the scanning mirror. Thus, disturbance of the CCD array working is prevented. It is however possible to use the useful surface of the scanning mirror in cases where the power of the beam produced by the luminous source is clearly greater than the ambient lighting, or when the wavelength of the luminous source (2) is significantly different from the pass-band of the imagery system.

What is claimed is:

1. A device for the acquisition of angular position of mechanical means movable about an axis, comprising:
a laser diode emitting an incident beam in a known direction,
a reflecting surface attached to the moving means,
means for detecting a beam reflected by said reflecting surface,
means for producing a reference signal corresponding to a determined position of the moving means, wherein the detector means includes a CCD line array positioned so as to be at least partially scanned by the reflected beam during the rotation of the moving means, the CCD line array being formed by an alignment of a large number of adjoining elementary charge coupled sensors substantially smaller than a length of a course scanned by the reflected beam, the device further including optical means for limiting the width of the incident beam, the array beam connected to an electronic circuit for producing a digital signal varying according to at least one of the position and the number of elementary sensors illuminated by the reflected beam wherein said optical limiting means and said array of sensors each receive parallel beams of light and wherein the means for producing a reference signal comprises a fixed semi-reflecting mirror provided between the luminous source and the reflecting surface attached to the moving means, said semi-reflecting mirror reflecting part of the incident beam onto the array of charge coupled sensors.

2. Device for the acquisition of the angular position of mechanical means movable about an axis, according to claim 1, wherein the means for producing a reference signal comprise a computer producing a reference signal which is a function of an integration of a position signal over a period corresponding to several cycles of the moving means.

3. Device for the acquisition of the angular position of mechanical means mobile about an axis, according to any one of claims 1 or 2, wherein it includes an electronic circuit including at least one threshold comparator producing a signal of a first value for the elementary sensors illuminated by the reflected beam and a signal of a second value for the elementary sensors not illuminated by said reflected beam.

4. Device for the acquisition of the angular position of mechanical means mobile about an axis, according to any one of the claims 1 or 2, wherein the means for limiting the width of the incident beam comprise a slot located between the luminous source and the fixed semi-reflecting mirror, the principal axis of said slot being perpendicular to the plane formed by the incident beam and the reflected beam.

5. Device for the acquisition of the angular position of mechanical means mobile about an axis, according to claim 4, wherein the width of the slot is substantially equal to:

$$a = \sqrt{2\lambda D}$$

where D is the optical distance between the slot and the array, and $\lambda$ is the wavelength of the luminous source.

6. Device for the acquisition of the angular position of mechanical means mobile about an axis, according to any one of the claims 1 or 2, wherein the reflecting surface consists of part of the unused surface of the mobile means.

* * * * *